United States Patent Office 2,862,977
Patented Dec. 2, 1958

2,862,977

HYDROGENATION OF PERFLUOROALKANOIC ACIDS TO 1,1-DIHYDROPERFLUOROALKYL ALCOHOLS OVER RUTHENIUM CATALYST

Ralph Courtenay Schreyer, Wilmington, Del., assignor to E. I. du Pont de Nemours and Company, Wilmington, Del., a corporation of Delaware No Drawing. Application December 21, 1956
Serial No. 629,799

3 Claims. (Cl. 260—633)

The present invention relates to the hydrogenation of perfluoroalkanoic acids and more particularly to the hydrogenation of perfluoroalkanoic acids to produce 1,1-dihydroperfluoroalkyl alcohols.

The hydrogenation of perfluoroalkanoic acids has heretofore been carried out employing lithium aluminum hydrides. The inflammability and instability of the lithium aluminum hydride makes this process extremely hazardous and difficult to control. The high cost of the lithium aluminum hydride makes this process furthermore economically unattractive.

It is therefore the object of this invention to provide an economic and safe process for the preparation of 1,1-dihydroperfluoroalkyl alcohols by the hydrogenation of perfluoroalkanoic acids.

The object of the present invention is accomplished by a process which comprises contacting a perfluorinated alkanoic acid with hydrogen in the presence of a finely divided ruthenium and recovering a 1,1-dihydroperfluoroalkyl alcohol having the formula:

$$R_fCH_2OH$$

wherein $R_f$ is a perfluorinated alkyl group. This is a most remarkable result since it was heretofore generally believed that perfluoroalkanoic acids were too inert to react with hydrogen, per se, in the presence of a hydrogenation catalyst.

The acids employed in the present invention are perfluoroalkanoic acids having the general formula:

$$C_nF_{2n+1}COOH$$

wherein $n$ is a number greater than one. The size of the perfluorocarbon radical attached to the acid group is not critical in the process of the present invention and the number of carbon atoms in the perfluorocarbon radical may vary greatly and is only limited by the availability of the acid. The acids are in general, produced by electrolysis of the corresponding hydrocarbon acid dissolved in anhydrous liquid hydrogen fluoride. The electrolysis causes the substitution of the hydrogen of the acid with the fluorine released at the cathode.

The hydrogenation is generally carried out in the presence of a liquid phase which may either be the perfluoroalkanoic acid itself if liquid at reaction conditions or may be any inert liquid medium such as a saturated hydrocarbon, a hydrocarbon alcohol or a hydrocarbon ether in which the acid is at least partially soluble. In order to obtain a reasonable reaction rate the temperature should be at least 150° C. Temperatures above 300° C. are generally not employed since no significant advantages are obtained by going to higher temperatures.

The hydrogen pressure should at least exceed 1000 p. s. i. and it is preferable to employ a pressure in the range of 3,000 to 10,000 p. s. i. Optimum hydrogen pressure depends on other variables such as the quantity of catalyst, the reaction temperature and the pressure capacity of the equipment employed.

The hydrogenation catalyst employed is preferably finely divided ruthenium on an inert carrier such as carbon. The ruthenium catalysts employed in the present invention may be prepared by known methods and are commercially available. The quantity of catalyst will vary with reaction conditions and with the quantity of the acid to be hydrogenated, but is in general in accord with quantities of hydrogenation catalysts employed heretofore.

The invention is further illustrated by the following example showing the preparation of 1,1-dihydroperfluorooctanol ($C_7F_{15}CH_2OH$) from perfluorooctanoic acid ($C_7F_{15}COOH$):

*Example*

Into a stainless steel pressure vessel was charged 50 ml. of diethyl ether, 26 g. of perfluorooctanoic acid and 5 g. of a catalyst comprising 5% ruthenium on carbon. The reaction mixture was heated to 175° C. and pressured to 5000 p. s. i. with hydrogen. The reaction mixture was agitated for two hours while pressure and temperature were maintained. The vessel was then cooled to room temperature and excess hydrogen was vented off. The reaction mixture was filtered to remove the catalyst and then distilled. On distillation 12 g. of 1,1-dihydroperfluorooctanol boiling at 162–166° C. and having a melting point at 25 to 30° C. was obtained. Fluorine and hydroxyl analysis of the product showed 66.3% fluorine and an OH-number of 139 as compared to the calculated numbers of 71.3% fluorine and OH number of 140.5 on the basis of $C_7F_{15}CH_2OH$. Infra-red analysis showed the presence of $CH_2OH$ groups but no carboxyl groups could be detected.

Other acids which can readily be converted to the 1,1-dihydroperfluoroalkanol include perfluorobutyric acid, perfluoropentanoic acid, perfluorodecanoic acid, etc. It is furthermore possible to convert divalent acids such as the perfluoroadipic acid to the corresponding diol by the process of the present invention.

The alcohols of the present invention are useful as chemical intermediates and are particularly useful for introducing saturated fluorocarbon groups into various derivatives. Thus the alcohols prepared by the present invention may be reacted with phosphorous pentachloride to give rise to fluorinated phosphate esters which on further halogenation form perhalogenated phosphate esters which find applications as flame retardants in materials and fluids and especially in fire resistant hydraulic fluids. They may further be reacted with siliceous materials containing silanol groups to result in estersils which are useful as thickening agents for fluorocarbon oils and are also useful as fillers in silicone type of rubbers. The 1,1-dihydrofluoroalcohols are further useful in the preparation of fluorinated surface active agents. They may also be employed directly as solvents and plasticizers for fluorinated resins.

I claim:

1. A process for the preparation of 1,1-dihydroperfluoroalkyl alcohols having the formula:

$$C_nF_{2n+1}CH_2OH$$

wherein $n$ is a number greater than one which comprises contacting a perfluoroalkanoic acid with hydrogen at a pressure of at least 1000 p. s. i. in the presence of a finely divided ruthenium catalyst at a temperature above 150° C.

2. The process as set forth in claim 1 wherein the perfluoroalkanoic acid is perfluorooctanoic acid.

3. The process as set forth in claim 1 wherein the catalyst is 5% ruthenium on carbon.

References Cited in the file of this patent

UNITED STATES PATENTS

| | | |
|---|---|---|
| 2,607,805 | Gresham | Aug. 19, 1952 |
| 2,607,807 | Ford | Aug. 19, 1952 |
| 2,732,370 | Codding | Jan. 24, 1956 |